United States Patent Office 2,949,166
Patented Aug. 16, 1960

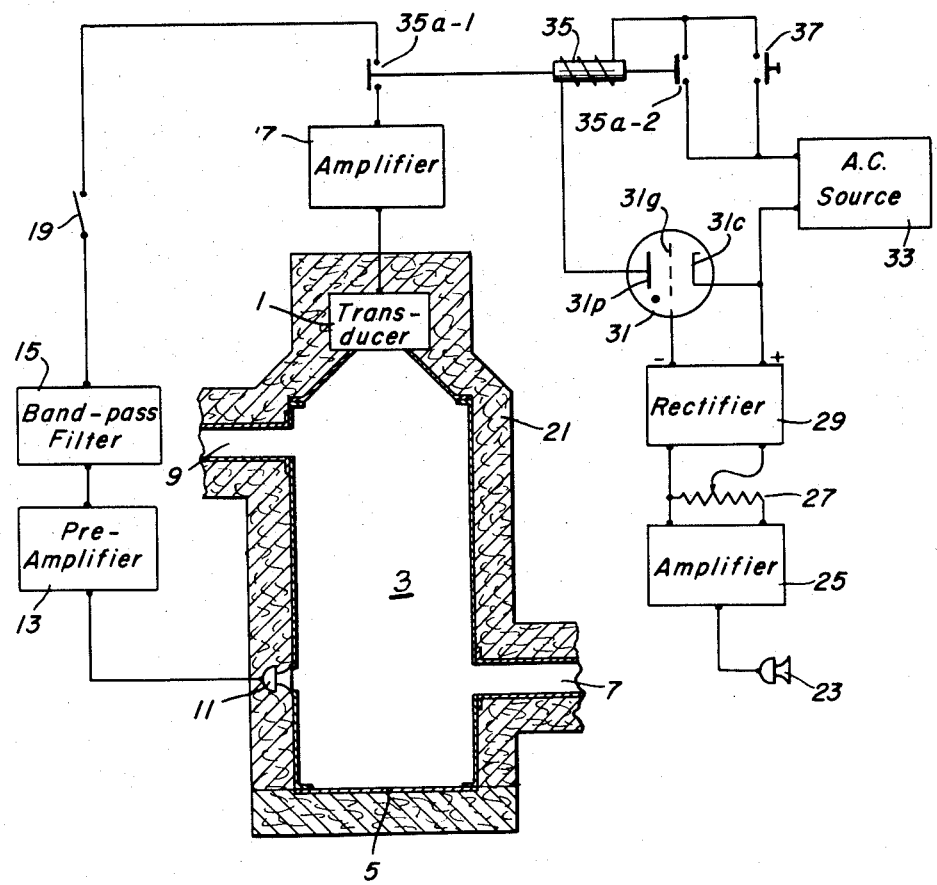

2,949,166

APPARATUS FOR SONIC TREATMENT OF GASES AND FLUIDIZED BEDS

William E. Coleman, Monroeville, and Thomas F. Reed, Pittsburgh, Pa., assignors to United States Steel Corporation, a corporation of New Jersey Filed June 27, 1957, Ser. No. 668,473

3 Claims. (Cl. 183—1)

This invention relates to the sonic treatment of finely divide solids dispersed in a gas or gases and more particularly to apparatus for the sonic treatment of metallurgical furnace gases and the like to agglomerate and remove solids therefrom.

Gases from industrial processes frequently contain considerable quantities of entrained solids which make utilization or disposal of the gases difficult. In many instances the entrained solids are valuable and represent a sizable loss if not recovered. Economical treatment of such gases is of particular concern to operators of metallurgical furnaces and processes involving the use of fluidized beds since the gases from such operations contain an exceptionally large portion of very finely divided materials which cannot be removed by conventional mechanical separators.

Several methods for treating the gases have been proposed but none have proven completely satisfactory. For example, the fines can be removed by scrubbing the gases with water; however, recovery of the solids from the wash-water is expensive and in some instances the water is contaminated with soluble chemicals creating an equally serious problem in disposal of waste-water. The fines can be removed in a dry condition by electrostatic precipitation but the recovered particles retain their aerosol characteristics, necessitating further processing to a form which can be conveniently handled. Sonic treatment of the gases to agglomerate the fines has been tried but has proven impractical with presently available equipment which is excessively costly and inefficient.

Prior attempts to adopt sonic treatment have been based on the premise that frequencies of at least 7000 to 9000 cycles per second were required. This limited the choice of sound generating means to magneto-strictive devices or sirens which are costly to construct and operate and impose difficult problems of control. In our studies of the matter we have discovered that the fines can be agglomerated into spheroidal particles having sufficient size and strength to be handled and separable from the gases by conventional cyclone type catchers by treatment at frequencies of 500 to 2500 cycles provided an energy level of at least 157 decibels is used. This discovery permits the use of less costly electromagnetically operated diaphragms as the sound generating means. And accordingly it is an object of the present invention to provide a system for treating gases containing finely divided solids with sound of a frequency between 500 and 2500 cycles per second at a level in excess of 157 decibels.

To be economically practical, sonic treatment must be conducted at a resonant frequency of the treating system. Resonance of system depends upon temperature of the gas and the size, shape, materials and details of construction of the treating chamber. The problem is complicated by the fact that chambers of the size required for commercial treatment have several major resonances and inexplicable shifts in resonance occur. Accordingly, it is a further object of the present invention to provide a system that is arranged to be self exciting to operate at a resonant frequency of its own choosing.

Sound at the levels contemplated in the present invention cannot be endured and can do bodily harm. Thus a break or failure of equipment releasing the sound from the treating chamber into the surrounding working area would be extremely dangerous to the operators. Accordingly, it is another object of the present invention to provide a system which will automatically shut down should the sound level in the working area rise above a predetermined value.

The foregoing and other objects will be apparent from the following specification when read in conjunction with the attached drawing in which the single figure is a schematic showing of the essential elements of the system of the present invention.

With particular reference to the drawing, the reference numeral 1 identifies a loud speaker or transducer adapted to convert electrical energy to sound and is preferably comprised of several electromagnetically operated diaphragms and means for directing the wave energy of each diaphragm into a common wave front. It is mounted at the upper end of an elongated, substantially cylindrical treating chamber 3 in a manner to direct the wave front downwardly into this chamber in the direction of the longitudinal axis thereof. The bottom of chamber 3 is closed by a removable clean-out plate 5, and an inlet port 7 for gas to be treated is provided adjacent the bottom; an outlet port 9, toward the top thereof. Located in the side and toward the bottom so as to be activated by sound waves in the chamber is a radio microphone or transducer 11 adapted to convert sound into electrical energy of corresponding frequency. Connected in succession between the microphone 11 and transducer 1 to power the latter are a preamplifier 13, a band-pass filter 15 and a power amplifier 17. These units include primary circuits energized by a suitable voltage source, not shown, and together with the transducer 1, chamber 3 and microphone 11 form a self-excited, wave transmitting loop in which vibration is initiated by stray noise and is maintained by the amplified feed-back from the microphone, and which seeks to oscillate at a frequency which is resonant for the chamber 3. The latter, however, may be highly resonant at several frequencies, in which case, oscillation in this loop can shift frequency in an unpredictable manner. Uncontrolled shifting between resonant frequencies of the chamber is undesirable since it adversely affects efficiency of treatment and is prevented by band-pass filter 15. The pass band of the latter is set to exclude all but one resonant frequency of the chamber, limits of the band being set wide enough to accommodate expected changes in value of the selected frequency caused by variations in the temperature and pressure of the gas being treated and similar factors. A switch 19 is provided in the circuit between the filter 15 and the power amplifier 17 to permit opening of the loop and shut-down of the system. Alternatively the primary circuit of the power amplifier can be deenergized.

The design of the individual electrical units comprising the present apparatus is well known and it will be recognized by those skilled in the art that details of electrical circuiting thereof can be widely varied. For present purposes it is essential only that the units be matched and capable of producing sound energy at a resonant frequency of the sound chamber within the range 500 to 2500 cycles per second and at a pressure of at least 20,000 dynes per square centimeter. The latter pressure corresponds to a sound level of about 160 decibels and is a preferred minimum operating value; as previously mentioned, a sound level of less than 157 decibels is relatively ineffective. Higher levels can be used, the upper limit is fixed by capacity limitations of available equipment and economic considerations only. Because of the high sound level used, all portions of treating chamber 3 and inlet and outlet connections thereto are provided with a heavy layer of sound proofing material 21. In addition, to protect personnel from injury in the event a broken connection or similar accidental occurrence should release sound into the working area, a second microphone 23 is located outside the apparatus in the working area. This is connected to a voltage amplifier 25 and a selectable portion of its amplified output is taken from a voltage divider 27 and fed to a rectifier 29. The latter is polarized to apply a negative biasing voltage across the grid 31$g$ and the cathode 31$c$ of a gas tube 31. Plate 31$p$ of tube 31 is connected to an alternating current source 33 through the operating coil of a relay 35 having two sets of normally open contacts 35$a$–1 and 35$a$–2. Contacts 35$a$–2 are connected in series with operating coil of the relay; contacts 35$a$–1 are connected in the input circuit of the amplifier 17. A normally open push-button or reset switch 37 is connected across the contacts 35$a$–2.

Momentarily closing switch 37 completes the circuit from source 33 through tube 31 and relay 35, causing the latter to close. This circuit is maintained through contacts 35$a$–2 as long as tube 31 continues to pass current to the relay. Closing relay 35 completes the input circuit of amplifier 17 and places the system in condition for operation which is initiated by closing switch 19. Stray sound in the chamber 3 is picked up and converted to electrical energy by microphone 11, the output of which is boosted by preamplifier 13 and passed on to power amplifier 17 through band-pass filter 15 to transducer 1 to be reconverted to sound and passed on around the loop. Since the band-pass filter is arranged to pass only a limited range of frequencies, one of which is a major resonant frequency of chamber 7, a standing sound wave is rapidly developed in the chamber. The pressure of this wave is readily controlled by adjusting the degree of amplification effected by amplifiers 13 and 17. Being self exciting to automatically seek resonance, the loop will, during operations, automatically adjust its frequency of oscillation to compensate for changes in resonance occasioned by changes in temperature or pressure of the gas in chamber 7, provided the resulting frequency is within the limits of the pass-band of filter 15.

In addition, sound escaping from chamber 3 excites microphone 23 to produce a voltage proportional to the sound level in the working area. As previously described the output of this microphone is fed through voltage amplifier 25, a portion thereof being taken from a voltage divider 27, passed through rectifier 29 and impressed across the cathode and grid of the tube 31. The arrangement is such that grid 31$g$ becomes increasingly negative with respect to cathode 31$c$ as sound in the vicinity of microphone 23 increases. If this biasing voltage becomes sufficiently negative, it will stop conduction through tube 31 to deenergize relay 35 causing the latter to open. Opening of contact 35$a$–1 interrupts the input to amplifier 17 and immediately shuts down the sound generator and the apparatus will not operate until the source of excess sound to microphone 23 is found and removed and reset switch 37 is momentarily closed. The sound level at which conduction through tube 31 is stopped can be selected by adjusting the setting of voltage divider 27.

Gas containing finely divided solids to be agglomerated is introduced through the inlet port 7. The degree of agglomeration of the dispersed solids depends on time of retention in the chamber 3 and is regulated by controlling the rate of gas through-put. After discharge through the outlet port 9, the agglomerated particles are separated from the gas by any conventional means, e.g., cyclone separators. The treated particles are free of aerosol characteristics and behave much like sand, thus are readily handled in any subsequent operations.

The treating system of the present invention has been used successfully to recover the manganese containing dust from blast furnace gas carrying as little as 6 grains of dust per cubic foot, the particle size of the dust in the raw gas ranging from 0.1 to 1.0 micron. The gas itself contained 3% $CO_2$, 32–35% CO, 1.25–2.25% $H_2$, about 1% $CH_4$, balance $N_2$ and varied in temperature between 70 and 700° F. The treating chamber used was resonant at several frequencies in the range 500–2500 cycles per second. One of these having a value of about 1500 cycles per second, was selected and a band-pass filter 19 having a pass-band of 1400–1650 cycles per second was provided to accommodate the shift in value to be expected over the temperature range 70–700° F. Amplification in the sound loop was adjusted to provide a sound level of slightly more than 160 decibels in the treating chamber. Gas was fed through the chamber at a rate to provide 3 seconds of treatment. The treated gas was passed to a conventional cyclone separator and the agglomerated particles removed. The treated particles were found to measure about 20 microns and to be free of aerosol characteristics; the effluent gas was found to contain less than 0.5 grain of dust per cubic foot. Thus the treatment resulted in recovery of about 91% of the solids. Since the latter contained about 18% manganese, a sizable savings was realized in addition to the upgrading of the gas itself as a fuel.

The system is equally adapted to the treatment of the heavy dispersion of solids in gas encountered in fluidized bed processing, and can be used to agglomerate the fines in the space above such beds during processing, thus, increase the direct yield and reduce recovery equipment requirements.

While we have shown and described certain specific embodiments of our invention, it will be apparent that other adaptations and modifications may be made without departing from the scope of the following claims.

We claim:

1. Apparatus for the sonic treatment of finely divided solids dispersed in a gas comprising an elongated treating chamber resonant at a frequency between 500 and 2500 cycles per second having a closed bottom and inlet and outlet ports for material to be treated; a transducer comprising electrically operated means for producing sound waves and means for directing sound waves into a common wave-front mounted at the top of said chamber to direct said wave-front into the chamber along the longitudinal axis thereof; a microphone mounted toward the bottom of the chamber to be activated by sound waves therein and convert such sound energy to electrical energy of corresponding frequency; connected in succession between said microphone and said transducer to supply electrical power to the latter: a preamplifier, a band-pass filter adapted to pass a desired limited range of frequencies and a power amplifier, said microphone, preamplifier, band-pass filter, power amplifier, transducer and chamber forming a wave-transmitting loop which when energized oscillates at a resonant frequency between 500 and 2500 cycles per second; and means for initiating oscillation in said loop; said last mentioned means including a relay switch having an operating coil and two sets of normally open contacts, one set of said contacts being connected in circuit with said transducer to control the flow of power thereto; a control circuit comprising in series connection, the operating coil and second set of contacts of said relay, a gas tube having a grid, cathode and plate, and an A.C. source; a normal open push-button switch connected across said second set of relay contacts; a second microphone positioned to provide electrical energy proportionate to the sound level outside the treating chamber; connected in succession between said second microphone and said gas tube to impress a negative D.C. voltage across the grid and cathode of said tube, a voltage amplifier, a voltage divider and a rectifier adapted to receive a selectable portion of the drop across said divider and to impress a negative D.C. biasing voltage proportionate to said selectable portion across the grid and cathode of the gas tube whereby conduction through the tube is stopped when the biasing voltage rises above a desired minimum value.

2. Apparatus for the sonic treatment of finely divided solids dispersed in a gas comprising a resonant chamber having inlet and outlet ports for the material to be treated; a transducer mounted in said chamber and positioned to generate a sound wave therein; a microphone positioned to respond to sound waves in said chamber and convert the same to electrical energy of the same frequency; a band-pass filter adapted to pass electrical energy of a desired limited range of frequencies and electrically connected to the microphone to receive the electrical output thereof, and a power amplifier electrically connected to the band-pass filter to receive the output thereof and electrically connected to the transducer to supply power thereto, said microphone, band-pass filter, amplifier and chamber forming a self-excited, wave-transmitting loop which oscillates at a resonant frequency of the chamber, and an automatically operated switch means in circuit with the transducer to interrupt the flow of power thereto, said means comprising a relay having an operating coil and two sets of contacts, one of said sets connected in the power circuit to the transducer, a circuit comprising in series connection the second set of said relay contacts, the operating coil of the relay, a current conducting tube having grid, cathode and plate and an A.C. source, a second microphone positioned to provide electrical energy proportionate to the sound level outside the resonant chamber, a voltage divider electrically connected to said second microphone to receive the outlet thereof, rectifying means electrically connected to said voltage divider to receive a selectable portion of the drop thereacross and electrically connected to the aforementioned current conducing tube to impress a negative biasing D.C. voltage across the grid and cathode thereof.

3. Apparatus for the sonic treatment of finely divided solids dispersed in a gas comprising a treating chamber resonant at two or more major frequencies and having inlet and outlet ports for the material to be treated; a transducer mounted in said chamber and positioned to generate a sound wave therein; a microphone positioned to sound waves in said chamber and convert the same to electrical energy of the same frequency; a band-pass filter adapted to pass a band of frequencies including only one of said mapor resonant frequencies and electrically connected to the microphone to receive the electrical output thereof, and a power amplifier electrically connected to the band-pass filter to receive the output thereof and electrically connected to the transducer to supply power thereto, said microphone, band-pass filter, amplifier, transducer and chamber forming a self-excited, wave-transmitting loop which automatically oscillates at a resonant frequency of the chamber.

References Cited in the file of this patent
UNITED STATES PATENTS

| | | |
|---|---|---|
| 2,216,779 | Houghton et al. | Oct. 8, 1940 |
| 2,535,700 | Seavey et al. | Dec. 26, 1950 |
| 2,646,133 | Schutt | July 21, 1953 |
| 2,783,459 | Lienau et al. | Feb. 26, 1957 |

UNITED STATES PATENT OFFICE

CERTIFICATE OF CORRECTION

Patent No. 2,949,166                                                    August 16, 1960

William E. Coleman et al.

It is hereby certified that error appears in the printed specification of the above numbered patent requiring correction and that the said Letters Patent should read as corrected below.

Column 1, line 16, for "divide" read -- divided --; column 4, line 4, for "micron." read -- microns. --; line 22, for "grain" read -- grains --; column 6, line 4, for "conducing" read -- conducting --; line 12, after "positioned" insert -- to respond --; line 16, for "mapor" read -- major --.

Signed and sealed this 31st day of January 1961.

(SEAL)
Attest:
KARL H. AXLINE
Attesting Officer

ROBERT C. WATSON
Commissioner of Patents